United States Patent [19]

Jensen

[11] E Re. 29,475

[45] Reissued Nov. 15, 1977

[54] BATTERY CHARGING CIRCUIT RESPONSIVE TO GENERATOR OUTPUT VOLTAGE AND CURRENT

[75] Inventor: James Lee Jensen, St. Louis Park, Minn.

[73] Assignee: Honeywell Inc., Minneapolis, Minn.

[21] Appl. No.: 274,358

[22] Filed: July 24, 1972

Related U.S. Patent Documents

Reissue of:

[64] Patent No.: 3,350,619
Issued: Oct. 31, 1967
Appl. No.: 787,455
Filed: Jan. 19, 1959

U.S. Applications:

[62] Division of Ser. No. 640,168, Feb. 14, 1957.

[51] Int. Cl.[2] ..... H02H 7/06; H02J 7/14

[52] U.S. Cl. ..... 322/28; 320/32; 320/64; 323/22 T

[58] Field of Search ..... 322/25, 28; 323/22 T; 317/148.5 R; 320/9, 64, 32

[56] References Cited

U.S. PATENT DOCUMENTS

| | | | |
|---|---|---|---|
| 1,937,921 | 12/1933 | Stansbury | 322/28 |
| 2,644,894 | 7/1953 | Lo | |
| 2,776,382 | 1/1957 | Jensen | 323/22 T |
| 2,806,153 | 9/1957 | Walker | |
| 2,862,175 | 11/1958 | Guyton et al. | 323/22 X |
| 2,892,165 | 6/1959 | Lindsey | 323/22 |
| 3,300,709 | 1/1967 | Short et al. | 322/25 |

*Primary Examiner*—Robert J. Hickey
*Attorney, Agent, or Firm*—Trevor B. Joike

[57] ABSTRACT

*A voltage regulator for a vechicular generator having a field winding and a transistor in series therewith. The transistor is controlled by an oscillatory type, two transistor circuit with regenerative feedback which is responsive to the voltage and current output of the generator.*

15 Claims, 3 Drawing Figures

INVENTOR.
JAMES L. JENSEN
BY
Osmund R. Dahle
ATTORNEY

BATTERY CHARGING CIRCUIT RESPONSIVE TO GENERATOR OUTPUT VOLTAGE AND CURRENT

Matter enclosed in heavy brackets [ ] appears in the original patent but forms no part of this reissue specification; matter printed in italics indicates the additions made by reissue.

This application is a division of the copending application, Ser. No. 640,168, filed Feb. 14, 1957, and entitled Semiconductor Apparatus.

This invention relates to new and improved vehicular voltage regulators for use in regulating the output voltage and current of a generator of the type used in military vehicles, trucks, automobiles and the like. More specifically, the invention relates to a transistor vehicular voltage regulator in which a transistor switching circuit is utilized to control the energization of a generator field winding.

It is an object of this invention to provide a new and improved voltage-regulator with emphasis toward vehicular use, which regulator is of the transistor type and which has no mechanical vibrating contacts.

It is a further object of this invention to provide an improved vehicular voltage regulator of the transistor type which is effective to control the energization of an AC or a DC generator and which is relatively insensitive to mechanical shock and substantially unaffected by wide variations in ambient temperatures.

Figure 1:
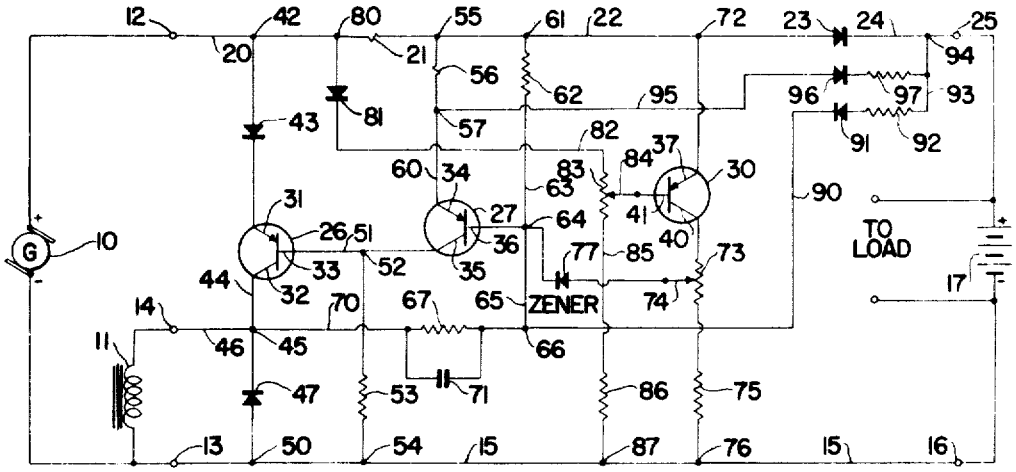
Figure 2:
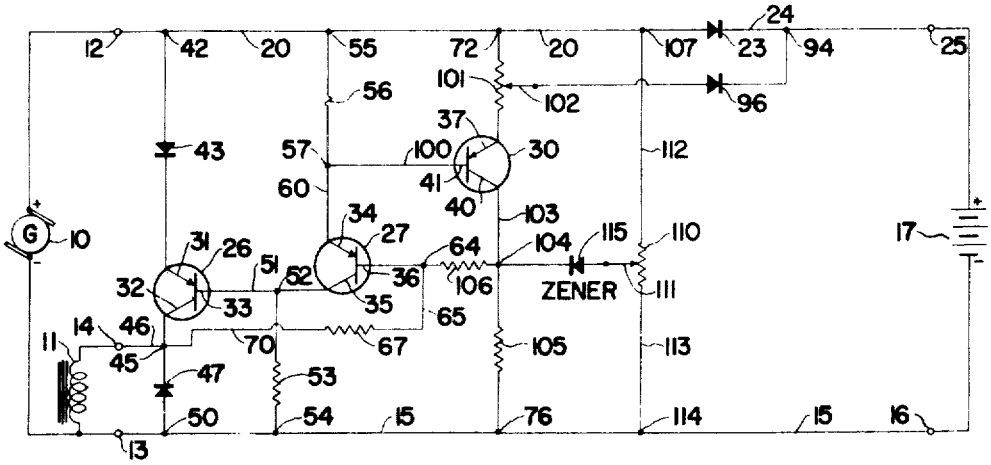
Figure 3:
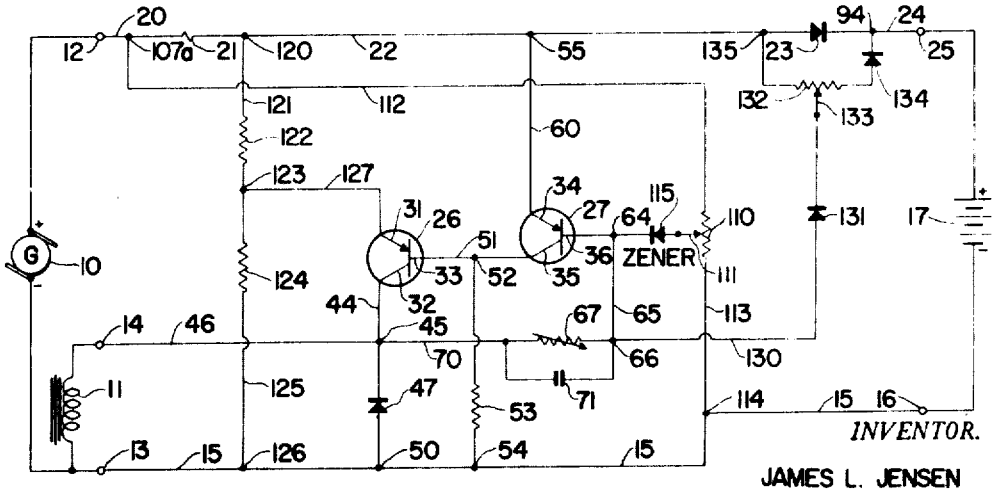

These and other objects of the present invention will be understood upon consideration of the accompanying specification, claims and drawings of which:

FIG. 1 is a schematic representation of a preferred embodiment of the invention; and FIGS. 2 and 3 are schematic representations of variations of the invention as shown in FIG. 1.

Referring now to FIG. 1, there is disclosed an electrical generator 10 which also includes a field or exciting winding or coil 11. The generator as shown is a self-excited DC generator of the type generally used on vehicles for the purpose of recharging batteries, and which is driven by the vehicle engine and which is capable of being operated over widely varying engine speeds, that is, from engine idling speed to full throttle. The generator to be controlled is not limited to the DC type generator of the type shown but may be any suitable type, for example, an AC generator, the output of which is connected to a rectifier. The generator has a pair of output terminals 12 and 13, the terminal 13 being connected by a conductor 15 to a negative terminal 16 of a battery 17. The generator terminal 12 is connected through a circuit including a conductor 20, a resistor 21 of a relatively small value, a conductor 22, a rectifier 23 of relatively high current carrying capacity, and a conductor 24 to a positive terminal 25 of the battery 17. The rectifier 23 may be of any suitable type, but is preferably a semiconductor junction diode, the current capacity of which is large enough to carry the generator output current.

The circuit of FIG. 1 also discloses three transistors 26, 27 and 30 shown as junction PNP transistors for convenience of explanation. The transistor 26 has an emitter electrode 31, a collector electrode 32 and a base electrode 33; the transistor 27 has an emitter electrode 34, a collector electrode 35, and a base electrode 36; and the transistor 30 has an emitter electrode 37, a collector electrode 40, and a base electrode 41. The collector electrode 32 of the transistor 26 is connected by a conductor 44, a junction 45, and a conductor 46 to a terminal 14 of the field winding 11. The other terminal of the field winding is connected to the generator output terminal 13. A rectifier 47, such as a junction diode, for damping transient potentials of winding 11, is connected across the field winding terminals by being connected from a junction 50 on the conductor 15 to the junction 45.

The base electrode 33 of transistor 26 is directly connected by a conductor 51 to the collector electrode 35 of transistor 27. A junction 52 on the conductor 51 is connected by a resistor 53 to a junction 54 on the conductor 15. A junction 55 on the [conducotr] *conductor* 22 is connected by means of a resistor 56, a junction 57 and a conductor 60 to the emitter electrode 34 of the transistor 27. A junction 61 on the positive conductor 22 is connected by a resistor 62, a conductor 63, and a junction 64 to the base electrode 36 of the transistor 27. The base electrode 36 is further connected by a junction 64, a conductor 65, a junction 66, a resistor 67, and a conductor 70 to the junction 45 which is in the collector circuit of transistor 26. A capacitor 71 is connected in parallel with the resistor 67. The emitter electrode 37 of transistor 30 is directly connected to the conductor 22 at a junction 72. The collector electrode 40 of the transistor 30 is connected by means of a potentiometer resistor 73, which has an adjustable wiper 74, and through a resistor 75 to a junction 76 on the conductor 15. The adjustable tap 74 of potentiometer 73 is connected by a voltage reference element 77, which is shown as a Zener diode, to the junction 64 and thus to the base electrode 36 of transistor 27.

A Zener diode is a semi-conductor junction rectifier poled so that current flows through it in the reverse or high resistance direction. The Zener voltage or Zener point is the voltage across the rectifying junction associated with that portion of the reverse E vs. I characteristic of a semi-conductor junction device wherein the voltage across the junction remains substantially constant over a considerable range of current values.

A bias potential for the base circuit of transistor 30 is provided by a network which commences at a junction 80 on the conductor 20 and flows through a junction diode 81, a conductor 82, a potentiometer resistor 83, which has an adjustable wiper contact 84, through a conductor 85 and a resistor 86 to a junction 87 on the conductor 15. The adjustable wiper 84 of the potentiometer 83 is directly connected to the base electrode 41 of the transistor 30. The base electrode 36 of the transistor 27 is connected by means of the junction 64, the conductor 65, the junction 66, a conductor 90, a junction diode rectifier 91, a resistor 92, and a conductor 93 to a junction 94 on the conductor 24 which connects to the positive terminal 25 of the battery 17. The emitter electrode 34 of the transistor 27 is connected by means of the conductor 60 the junction 57, a conductor 95, a junction diode 96, a resistor 97, and through the conductor 93, the junction 94 and the conductor 24 to the positive battery terminal 25.

Operation of FIG. 1

In considering the operation of the circuit of FIG. 1, it should be noted that the amount of electrical output from the generator 10 is controlled by the average amount of current flowing in the field winding 11 of the generator. The current flowing in the field winding flows through the switching transistor 26 and is controlled by the state of conduction of the transistor 26. It should be further noted that switching transistor 26 is operative to only two conditions, either current cutoff or current saturation, as will be explained.

Let it be assumed that the generator 10 has just commenced producing an electrical output, the polarity of which is positive at terminal 12 with respect to terminal 13 and that the terminal voltage is increasing but is still below the regulating potential. In this condition of operation the switching transistor 26 is biased fully conductive so that a maximum self-exciting current can flow from the positive output terminal 12 of the generator through the conductor 20, the junction 42, the junction diode 43, through the transistor 26 from emitter 31 to collector electrode 32, conductor 44, junction 45, conductor 46 to the field winding terminal 14 and through the field winding 11 to the negative general terminal 13. This exciting current may be in the order of one ampere. A base electrode current path can be traced for the transistor 26 commencing at the positive generator terminal 12 and flowing through the conductor 20, the junction 42, the diode 43, from emitter 31 to base electrode 33, conductor 51, junction 52, resistor 53, junction 54, and conductor 15 back to the negative generator terminal 13.

As the terminal voltage of the generator 10 becomes greater than the terminal voltage of the battery 17, to be charged, a charging current flows from the positive generator terminal 12 through the conductor 20, the resistor 21, the conductor 22, the rectifier 23, the conductor 24, junction 25, the battery 17, junction 16, and the conductor 15 back to the negative terminal 13 of the generator. The function of the diode 23 is to prevent a reverse current from flowing into the voltage regulator and generator during periods when the generator terminal voltage is less than the battery potential. Resistor 21 is preferably a small value, for example, it may be a fraction of an ohm.

The [conductor] *conduction* of the switching transistor 26 is controlled by the conduction of the control transistor 27. At such time as the terminal potential of the generator reaches a predetermined magnitude at which it is desired to regulate, the transistor 27 will become conductive, as will be explained in greater detail below. When control transistor 27 is caused to conduct, a current path may be traced from the positive generator terminal 12 through the conductor 20, the resistor 21, the junction 55, the resistor 56, the conductor 60, from the emitter to collector of transistor 27, conductor 51 to junction 52, through the resistor 53 to junction 54, and through the conductor 15 to the negative generator terminal 13.

With the switching transistor 26 remaining conductive, the exciting current flowing in the field winding 11 causes the generator terminal voltage to rise rapidly, and as the terminal voltage approaches the regulating value, the transistor 26 is switched off. The voltage magnitude at which regulation takes place is determined by the setting of the wiper contact 74 of voltage setpoint potentiometer 73. At the desired regulating voltage the potential between the base electrode 36 of transistor 27 and the wiper contact 74 is sufficient to reach the Zener point of the Zener diode 77 whereupon the diode becomes conductive and presents a very low impedance in the circuit. Upon diode 77 becoming conductive, a low impedance path for base current is present for the transistor 27, which path may be traced from the base electrode 36 through the Zener diode 77, wiper 74, the lower portion of potentiometer 73, resistor 75 and to the negative conductor 15 at the junction 76. An increase in the current conduction of transistor 27 results, tending to reduce the current flow of the switching transistor 26. As the conduction of transistor 26 is reduced the potential at the junction 45 in the collector circuit of transistor 26 changes, and a regenerative feedback potential appears through resistor 67 and capacitor 71 to the base electrode 36 of the control transistor 27. This feedback is in a direction to increase the current flow of transistor 27 thereby aiding the switching process until transistor 26 is switched off. With transistor 26 in an off position the energization of the field winding is reduced. The generator terminal voltage now drops, Zener diode 77 conducts less, the conduction of control transistor 27 is reduced, switching transistor 26 begins to conduct, the regenerative feedback circuit cuts transistor 27 off and switching transistor 26 again becomes conductive to repeat the cycle. This oscillatory type action is rapid and continuous.

The actual range over which the output voltage varies will be very small for the Zener diode conducts over a wide current range with extremely small voltage changes and therefore small changes in Zener current initiates the switching process which takes place repeatedly and very rapidly.

The output impedance of the control transistor 27 is very low when the transistor is conductive so that the potential of the collector electrode 35 and thus of the conductor 51 and base electrode 33 of transistor 26 approaches the potential at terminal 12. This is due to the fact that the magnitude of the resistor 53 is relatively large with respect to the combined series resistance of the resistors 21, 56, and the output impedance of transistor 27, so that most of the generator potential appears across the resistor 53. With the potential at the base electrode 33 approaching that of the generator terminal 12, as explained above, the conduction of transistor 26 can be cut off. To further assure that the transistor 26 will be cut off in this condition, the semi-conductor diode 43, which is in series with the emitter electrode 31, presents a very high impedance in the emitter circuit of transistor 26 and as a result thereof the conduction of the transistor 26 is substantially zero.

The junction diode 47 which is in parallel with the field winding 11 is effective to damp the voltage transients which would otherwise result from the rapid switching of the transistor 26 and the inductive action of the winding 11.

A base current path for the control transistor 27 may be traced from the positive generator terminal to the emitter electrode 34, to base electrode 36, junction 64, through the Zener diode 77, to the potentiometer wiper 74 of the voltage setpoint potentiometer 73, through the lower portion of potentiometer 73, and the resistor 75, to the negative conductor 15 and back to the negative generator terminal 13. The Zener diode 77 is chosen to have a reverse voltage characteristic of a predetermined magnitude, so that as the terminal voltage of the generator reaches the point at which it is desired to regulate, the potential existing between the wiper 74 of potentiometer 73 and the base electrode 36 of transistor 27 reaches the Zener point of the diode 77 and the diode becomes conductive. By adjusting the wiper 74 of the potentiometer 73, the terminal voltage at which regulation is commenced can be varied.

Under normal operating conditions, the transistor 30 is continuously conductive and the output impedance thereof is thereby maintained at a relatively low value. A current path may be traced from the positive generator terminal 12 through the conductor 20, the resistor 21, the conductor 22, the junction 72, from emitter to collector of transistor 30, through the potentiometer 73 and the resistor 75, and back through the conductor 15 to the negative generator terminals. It can be seen that the output impedance of the transistor 30 forms a portion of the biasing network of the control transistor 27, that is, if the output impedance of the transistor 30 changes, the potential of the wiper 74 of potentiometer 73 will be changed to vary the regulating point of the voltage regulator. The function of the transistor 30 is to provide current regulation when the output current of the generator reaches a magnitude at which it is desired to limit the generator output. It will be noted that by proper adjustment of the wiper 84 of potentiometer 83, the base electrode 41 of transistor 30 can be made negative with respect to the emitter electrode 37 so that under normal operating conditions, the transistor 30 will remain conductive. As the output current of the generator to the battery 17 or to the load increase, a voltage drop will appear across the resistor 21 which voltage is proportional in magnitude to the current output of the generator. The resistor 21 is preferably a very low value, for example, it may be in the order of .3 ohm. The voltage drop across this resistor is effective to change the potential of the emitter electrode 37 with respect to the base electrode 41 in a direction to tend to cut off the conduction of transistor 30 as the generator output current increases beyond its predetermined maximum value.

In other words, the conduction of the transistor 30 is dependent upon the output current of the generator; an increasing generator current resulting in an increasing potential drop across the current sensing resistor 21, which potential drop is effective to vary the bias across the input electrode of the transistor 30. Let it be assumed that the generator output current has increased to a value which results in a potential drop across the current sensing resistor 21 of a magnitude to bias the transistor 30 toward cut off. As transistor 30 is biased towards cut off, the output impedance of the transistor increases and the potential drop between the emitter electrode 37 and the collector electrode 40 increases. Since the transistor 30, the potentiometer 73 and the resistor 75 are in series across the supply source, a change in impedance of the transistor 30 is effective to change the potential appearing at the wiper 74 of the potentiometer 73. Thus it can be seen that as the current limit is reached and transistor 30 becomes less conductive, the potential at wiper 74 is made less positive. This potential change is in a direction to tend to increase the potential across Zener diode 77 allowing a larger current through the Zener diode, and cause the control transistor 27 to become conductive and subsequently causing the switching transistor 26 to be cut off. By varying the set point of wiper 84 of current setpoint potentiometer 83, the bias point of the transistor 37 can be controlled, and this set point determines the value at which current limiting in the regulator will take place.

The resistor 56, the junction diode 96 and the resistor 97 which are series connected, and which elements are in parallel with the large current carrying diode rectifier 23, are effective to provide compensation in the voltage regulator for the potential drop across the diode rectifier 23. It can be seen that due to the forward voltage drop across the diode 23, a parallel current path can be traced to the resistor 56, the junction 57, the conductor 95, the diode 96, and the resistor 97. As the generator current flowing through the diode rectifier 23 increases, the potential drop across the diode 23 will increase and the current flowing through the parallel path, above described, will also increase. It will be noted that the resistor 56 is in the emitter circuit of the transistor 27 so that as the potential across the resistor 56 is varied, the control point at which switching will take place in the control transistor 27 will be changed, or in other words, the generator terminal voltage will increase to a greater magnitude before voltage regulating will occur.

FIG. 2

The voltage regulator circuit of FIG. 2 is in most respects similar to the circuit of FIG. 1, and the corresponding components which appear in both figures have been given the same identifying numerals in FIG. 2. In FIG. 3, the current sensing resistor 21 which was shown in FIG. 1, is not shown, and the voltage developed across the large current carrying rectifier diode 23 is used as a measure of the generator current. In FIG. 2, the emitter electrodes 34 of the transistor 27 is connected to the conductor 20 by conductor 60, the junction 57, and the resistor 56. The junction 57 is directly connected to the base electrode 41 of the transistor 30 by a conductor 100. A potentiometer resistor 101 is connected between the emitter electrode 37 of the transistor 30 and the junction 72 on conductor 20. The potentiometer resistor 101 also includes a wiper contact 102 which is connected by the junction diode 96 to the junction 94 on the conductor 24. The collector electrode 40 of the transistor 30 is connected by a conductor 103, a junction 104, and a resistor 105 to the junction 76 on conductor 15. The collector electrode 40 by means of the conductor 103, the junction 104, a resistor 106, and the junction 64 is connected to the base electrode 36 of the transistor 27. A junction 107 on the conductor 20 is connected by means of a conductor 112, a voltage setpoint potentiometer resistor 110, which has an adjustable wiper 111, and through a conductor 113 to a junction 114 on the conductor 15. A Zener diode 115 is connected between the potentiometer wiper 111 of potentiometer 110 and to the junction 104.

In considering the operation of the voltage regulator circuit of FIG. 2, it will be noted that the switching transistor 26 controls the energization to the generator field winding 11 as is also the case in FIG. 1. The control transistor 27 is connected in current controlling relation to the switching transistor 26 so that when the control transistor 27 becomes conductive, the switching transistor is cut off thereby reducing the generator excitation. The function of the transistor 30 is in providing current limiting for the voltage regulator, and this transistor remains conductive until the current limiting value is reached. The resistor 105 in the base electrode circuit of transistor 27 and in the collector electrode circuit of transistor 30 provides a quiescent conduction current for the control transistor 27. The resistor 53 in the collector circuit of transistor 27 is chosen so that with the above mentioned quiescent current flowing in the transistor 27, the switching transistor 26 will remain conductive.

As the switching transistor 26 remains conductive, the exciting current flowing in the field winding 11 causes the generator terminal voltage to rise rapidly, and as the terminal voltage reaches the regulating value, the transistor 26 is caused to cut off. The voltage magnitude at which the regulator will operate is determined by the setting of the wiper 111 on the voltage calibration potentiometer 110. At the desired regulating voltage, the potential between the junction 104 and the potentiometer wiper 111 is sufficient to exceed the Zener point of the Zener diode 115 whereupon the diode becomes conductive and presents a very low impedance in the circuit. Upon diode 115 becoming conductive, a base current path is present for the transistor 27 which can be traced from the base electrode 36 through the resistor 106, the junction 104, the Zener diode 115, the lower portion of potentiometer 110, and through conductor 113 to the conductor 15 at junction 114. An increase in the conduction of the transistor 27 results, tending to reduce the current flow of the switching transistor 26. As the conduction of transistor 26 is reduced the potential at the junction 45 in the collector circuit of transistor 26 is changed and a regenerative feedback potential appears through the resistor 67 to the base electrode 36 of transistor 27, which feedback potential is in a direction to increase the current flow of transistor 27, which further reduces the conduction of transistor 26. The generator terminal voltage now drops, Zener diode 115 conducts slightly less, the conduction of control transistor 27 is reduced, switching transistor 26 again begins to become conductive. The regenerative feedback from the collector circuit of transistor 26 completes the switching process. This oscillatory type action is rapid and continuous.

The function of the transistor 30, as was stated above, is to provide current regulation. As the current flowing through the junction diode rectifier 23 increases, the potential existing across the terminals of the rectifier also increases. A parallel circuit around the diode 23 can be traced from the junction 72 through the upper portion of the current calibration potentiometer 101 to the wiper 102 and through the junction diode 96 to the junction 94 on the conductor 24. It can be seen that as the potential drop across the rectifier 23 increases the current flowing through the parallel path will likewise increase. The resulting increase in potential drop across the portion of potentiometer 101 affects the input bias of the transistor 30 in a direction tending to cut off the conduction of transistor 30. Adjustment of the wiper 102 on the potentiometer 101 controls the point at which current regulation is made. As the current regulating point is reached and transistor 30 tends to become less conductive, the current flowing through the resistor 105, due to the collector current of transistor 30, is reduced thereby affecting the bias of the transistor 27 in a direction to increase the current flow of that transistor. The increase of current flow in transistor 27 is effective, as was previously described to cause the switching transistor 26 to be cut off. The transistor 30, as shown in FIG. 2, is also effective to provide temperature stability for the circuit as it provides temperature compensation for the transistor 27.

FIG. 3

The circuit of FIG. 3 is basically similar to the voltage regulator circuits above discussed, and this circuit may be useful where the temperature extremes under which the apparatus must operate are not as severe as would require the more complicated circuit of FIGS. 1 or 2. It will be noted that in this circuit only two transistors need be used, the switching transistor 26 and the control transistor 27. Much of the circuit is similar to that shown in FIGS. 1 and 2, and the same identifying numerals are used in the above figures where the numerals are applicable. The discussion immediately following will be limited to the circuit elements shown in this figure which have not been discussed in the prior figures.

A voltage divider path may be traced from a junction 120 on the conductor 22 and through a conductor 121, a resistor 122, a junction 123, a resistor 124, and a conductor 125, to a junction 126 on the conductor 15. The emitter electrode 31 of transistor 26 is connected by a conductor 127 to the junction 123 of the voltage divider. The resistor 122 is effective to provide a small reverse bias to the switching transistor 26 and operates to perform substantially the same function as the diode 43 of FIGS. 1 and 2. The collector electrode and base electrode circuits of transistor 26 are connected as explained in FIG. 1. A further voltage divider exists from the junction 107a on the conductor 20 and through the conductor 112, the voltage setpoint potentiometer resistor 110, and the conductor 113 to the junction 114 on the conductor 15. The wiper 111 of the potentiometer 110 is connected to the base electrode 36 of the transistor 27 by the Zener junction diode 115 in the same manner as was described in FIG. 2. A circuit which parallels the diode rectifier 23 can be traced from a junction 135 on the conductor 22 through a current setpoint potentiometer resistor 132 and a junction diode 134 to the junction 94 on the conductor 24. The potentiometer 132 has a movable wiper contact 133 which is connected by a junction diode 131 and a conductor 130 to the base electrode circuit of transistor 27 at the junction 66.

In considering the operation of the circuit of FIG. 3, let it be assumed that the generator terminal voltage is below the regulating point. Under these conditions the switching transistor 26 is conductive and a current path can be traced from the positive generator terminal 12, the conductor 20, the resistor 21, the junction 120, the conductor 121, the resistor 122, the junction 123, the conductor 127, through the transistor 26 from emitter to collector, through the conductors 44 and 46 and through the field winding 11 to the negative generator terminal. With the field winding energized the terminal voltage of the generator rises rapidly and the potential existing across the Zener diode 115 becomes sufficient so that the diode conducts in the Zener or reverse direction. A base current path for the control transistor 27 can then be traced from the emitter electrode 34 to the base electrode 36, the junction 64, the Zener diode 115, the potentiometer wiper 111, through the lower portion of the voltage setpoint potentiometer 110 and through a conductor 113 to the junction 114 on the negative conductor 15. The increase in conduction of the transistor 27 is effective, as has been previously described, to cut off the switching transistor 26 thereby reducing the excitation to the generator. The terminal voltage at which the generator will be regulated can be adjusted by adjusting the potentiometer wiper 111.

Current regulation in this apparatus is achieved by sampling the voltage appearing across the diode rectifier 23. The voltage drop appearing across the potentiometer winding 132 is a measure of the generator current to the load. A portion of the voltage appearing across the current setpoint potentiometer 132, as selected by the setting of the wiper 133, is applied as a bias potential between the emitter electrode 34 and the base electrode 36 of the control transistor 27. It can be seen therefore that at a predetermined value of generator current the potential developed across the potentiometer 132 will be sufficient to cause the control transistor 27 to conduct thereby causing transistor 26 to be cut off and reduce the excitation to the generator.

In FIG. 1, as has been described, the resistor 56 which has terminal 57 directly connected to emitter 34, together with the diode 96 and resistor 97 adjusts the potential at emitter 34 of transistor 27 as a function of load current to compensate for the increasing potential drop across the diode rectifier 23 with increasing load current, In FIG. 3, the resistor 21, which is in series with conductor 22 and diode 23 between the generator and the load and which obviously has the load current flowing therethrough, has one of its terminals directly connected to the emitter 34 and the other of its terminals directly connected to the voltage set point potentiometer resistor 110, as has been described. As current to the load through diode 23 increases it is obvious that the voltage across resistor 21 will increase in direct proportion to the increase in current therethrough. Obviously, since the potential developed across resistor 21 is applied in the bias circuit interconnecting the base 36 and the emitter 34 of the transistor 27, the terminal voltage at which the generator is regulated is dependent upon that potential and varies as a function of load current to compensate for the increasing potential drop across the diode rectifier 23 with increasing load current. In other words, since the voltage drop developed across resistor 21 obviously renders the emitter 34 less positive with respect to the base 36, and increasingly so as the output current increases, the control point at which switching will take place in the control transistor 27 will be changed and the generator terminal voltage will increase to a greater magnitude.

Under conditions of high temperature operation, it may be desirable to provide a bias circuit of the type disclosed in FIG. 1, from the positive battery terminal to the base electrode 36 of transistor 27 in the circuits of FIGS. 2 and 3. This circuit, which may be necessary to insure a proper initial condition of operation of the switching circuit, can be traced in FIG. 1 from positive terminal 25 through resistor 92, diode 91, and conductors 90 and 65 to the base electrode 36.

In general, while I have shown certain specific embodiments of my invention, it is to be understood that this is for the purpose of illustration and that my invention is to be limited solely by the scope of the appended claims.

I claim:

1. In combination, a power source, a control winding for varying the voltage input of said power source as a function of current flow therethrough, a first transistor having emitter, collector, and base electrodes, a second transistor having emitter, collector, and base electrodes, [and] *an* output circuit energized by said power source, a first circuit connected across the said output circuit including the emitter-collector circuit of said first transistor and said control winding, a second circuit connected across said output circuit including the emitter-collector circuit of said second transistor, means connecting the base electrode of said first transistor with the collector electrode of said second transistor, voltage responsive means connected with said output circuit and the base electrode of said second transistor, and means for causing said first transistor to operate at only two stable conditions of operation, one of which is the substantially fully conductive state and the other of which is the substantially fully non-conductive state, said last named means including a feedback circuit connecting said first circuit and the base circuit of said second transistor.

2. The system according to the preceding claim wherein the feedback circuit includes a condenser.

3. A control circuit for a power source having a control winding that varies the output voltage of said source in response to current flow therethrough comprising, a D.C. output circuit connected with said power source, a first transistor having base, collector and emitter electrodes, a first resistor, means connecting said first resistor, the emitter-collector circuit of said first transistor and said control winding in series across said D.C. output circuit, a second transistor having base, emitter and collector electrodes, means connecting the emitter-collector circuit of said second transistor in shunt with the emitter-base circuit of said first transistor with the emitter electrode of said second transistor being connected between said first resistor and the emitter electrode of said first transistor, a voltage responsive diode, means connecting said voltage responsive diode between the base electrode of said second transistor and said D.C. output circuit, and a second resistor connected between the junction of the base electrode of said second transistor and said voltage responsive diode and one side of said D.C. output circuit.

4. A control circuit for a power source having a control winding that varies the output voltage of said source in response to current flow therethrough comprising, a D.C. output circuit connected with said power source, first and second transistors each having base, collector and emitter electrodes, a first *series* circuit connected across said D.C. output circuit including the emitter-collector circuit of said first transistor, a first resistor and said control winding, a second *series* circuit connected across said D.C. output circuit including said first resistor and the emitter-collector circuit of said second transistor, a voltage responsive diode, means connecting said voltage responsive diode between the base electrode of said second transistor and said D.C. output circuit, a second resistor, means connecting one side of said first and second resistors together and to one side of said D.C. output circuit, and means connecting the opposite side of said second resistor with the junction of said second transistor base electrode and *said* voltage responsive diode.

5. [In an electric circuit for controlling current flow through a circuit element, the combination] *A control circuit for a power source having a control winding that varies the output voltage of said source in response to current flow therethrough* comprising, [a power source] *an output circuit connected with said power source*, a first transistor, a diode having a substantially constant voltage drop thereacross with varying current flow therethrough, means connecting the emitter-collector circuit of said first transistor, said diode and said [circuit element] *control winding* in series [with said power source] *across said output circuit* whereby the current flow through said [circuit element] *control winding* varies as a function of the emitter-collector conductance of said first transistor, a second transistor, means connecting said second transistor with said first transistor and [with said power source] *to said output circuit* including means for causing said first transistor to conduct inversely with the conduction of said second transistor, and means connecting the emitter-base circuits of said first and second transistors and said diode in a series loop circuit.

[6. A control circuit for a power source having a control winding that varies the output voltage of said source in response to current flow therethrough comprising, a D.C. output circuit having a pair of output leads connected with said power source, a transistor having a base, emitter and collector, a diode having a substantially constant voltage drop thereacross with varying current flow therethrough means connecting said transistor, control winding and diode in series circuit relationship with each other and across said output leads, means operating in response to the voltage appearing across said output leads for varying the conduction of said transistor including means for rendering said transistor either fully conductive or fully nonconductive, said last-named means including means for connecting said diode across the base and emitter of said transistor in such a direction that the voltage appearing across said diode opposes current flow from emitter to base in said transistor when said transistor is rendered substantially nonconductive.]

[7. A control circuit for a power source having a control winding that varies the output voltage of said source in response to current flow therethrough comprising, a D.C. output circuit connected with said power source, a first transistor having base, emitter and collector electrodes, a diode having a substantially constant voltage drop thereacross with varying current flow therethrough, means connecting said diode, emitter-collector circuit of said first transistor and said control winding in series and across said D.C. output circuit, a second transistor having base, collector and emitter electrodes, means connecting the base electrode of said first transistor with the collector electrode of said second transistor and with a first side of said D.C. output circuit, means connecting the emitter electrode of said second transistor with one side of said diode, a resistor connected directly between the base electrode of said second transistor and the second side of said D.C. output circuit and means for controlling the conduction of said second transistor in response to changes in voltage across said D.C. output circuit.]

8. In an electric circuit for controlling the current flow through a circuit element, the combination comprising, a power source, an output circuit energized by said power source, a first transistor having base, emitter and collector electrodes, a semiconductor diode, means connecting said semiconductor diode, said circuit element and the emitter-collector circuit of said first transistor *in series circuit and* across adid output circuit, a second transistor having base, emitter and collector electrodes, means connecting the emitter-collector circuit of said second transistor in parallel with the emitter-collector circuit of said first transistor, means connecting the base electrode of said first transistor[,] with the collector electrode of said second transistor, control means connected with the base electrode of said second transistor, and means connecting opposite sides of said [semi-conductor] *semiconductor* diode with the emitter electrodes of said transistors.

[9. In an electric circuit for controlling the current flow through a circuit element, the combination comprising, a power source, an output circuit energized by said power source, a first transistor having base, emitter and collector electrodes, a second transistor having base, emitter and collector electrodes, a first circuit connected across said output circuit including said circuit element and the emitter-collector circuit of said first transistor, a second circuit connected across said output circuit including the emitter-collector circuit of said second transistor, means connecting the collector electrode of said second transistor with the base electrode of said first transistor, control means connected with said output circuit and with the base electrode of said second transistor, and means causing said first transistor to be substantially fully nonconductive when said second transistor is substantially fully conductive, said last named means including a semiconductor diode connected in said first circuit and connected to cancel the voltage appearing across the emitter-collector circuit of said second transistor.]

10. In a battery charging circuit, the combination comprising, a source of direct current power having a control winding for controlling the voltage output of the source as a function of current flow therethrough, a storage battery connected in circuit with said power source to be charged thereby, a rectifier connected between said power source and storage battery for preventing current flow from said battery toward said power source, voltage regulating means connected in circuit with said power source, a sensing circuit for said voltage regulating means connected in circuit with said power source, means for applying a first voltage to said sensing circuit that is proportional to the outout voltage of the said power source, and means for decreasing the apparent voltage sensed by said circuit to increase the output voltage of the said power source to thereby compensate for the voltage drop across said rectifier.

11. In a battery charging circuit, the combination comprising, a direct current generator having a field winding for controlling the voltage output of said generator as a function of current flow therethrough, a load circuit connected to be energized from said generator, a storage battery connected with said load circuit, a rectifier connected between said generator and said storage battery for preventing current flow from said battery toward said generator, means for [controling] *controlling* the voltage output of said generator including a transistor connected in circuit with said generator and field winding, an electric circuit for controlling the conduction of said transistor, means for deriving a first voltage that is proportional to the output voltage of said power source, means for deriving a second voltage that is proportional to load current, and means for applying the difference of said first and second voltages to said electric circuit.

12. In a battery charging circuit, the combination comprising, a D.C. generator having a field winding for controlling the output of said generator as a function of current flow therethrough, a load circuit including a storage battery connecting to be energized by said generator, a rectifier connected between said generator and storage battery for preventing current flow from said battery toward said generator, voltage regulating means connected with said generator and said field winding for controlling the current flow through said winding as a function of the output voltage of said generator, a voltage sensing circuit for said voltage regulating means, means for deriving a voltage that is proportional to the output voltage of said power source, means for deriving a second voltage that is proportional to load current including a resistor connected in series with said rectifier, and means for applying the difference of said first and second voltages to said voltage sensing circuit.

13. In a battery charging circuit, the combination comprising, a D.C. generator having a field winding for controlling the output voltage of said generator as a function of current flow therethrough, a load circuit connected to be energized from said generator, a storage battery connected with said load circuit, a rectifier connected between said generator and said battery for preventing current flow from said battery toward said generator, voltage regulating means connected with said generator and with said field winding for controlling the voltage output of said power source, means for deriving a first voltage that is proportional to the output voltage of said power source including a circuit element having resistance connected directly across said generator, means for deriving a second voltage that is proportional to load current including a second resistor connected in series with said rectifier, and means for applying the difference of said first and second voltages to said voltage regulating means.

14. In a battery charging circuit, the combination comprising, a generator having a field winding for controlling the voltage output of said generator as a function of current flow therethrough, a load circuit connected to be energized from said generator, a storage battery connected with said load circuit, a pn junction semiconductor rectifier connected between said generator and said storage battery for preventing current flow from said storage battery toward said generator, voltage regulating means for controlling the voltage output of said generator connected in circuit with said control winding and said generator, means for deriving a first voltage that is proportional to the output voltage of said generator, means for deriving a second voltage that is proportional to output current of said generator, and means for applying the difference of said first and second voltages to said voltage regulating circuit.

15. In combination, a direct current generator having a field winding for controlling the voltage output of said generator as a function of current flow therethrough, a direct current load circuit connected to be energized by said generator, a storage battery connected with said load circuit to be charged thereby, a rectifier connected between said generator and said battery and poled in such a direction as to prevent current flow from said battery toward said generator while permitting current flow between said generator and battery, means including voltage sensing means connected with said load circuit for varying the current flow through said control winding as a function of voltage appearing across said load circuit, and means for applying a voltage to said voltage sensing means of such a polarity as to cause said sensing means to sense an apparent decrease in load voltage whereby the voltage output of said generator is increased to compensate for the voltage drop across said rectifier.

16. In a battery charging circuit, the combination comprising, a direct current generator having a field winding, a load circuit connected to be energized from said generator, a storage battery connected with said load circuit, a pn junction semi-conductor rectifier connected between said generator and said storage battery for preventing current flow from said storage battery toward said power source, voltage regulating means including a transistor connected in circuit with said generator and field winding for controlling the voltage output of said generator, a control circuit for controlling the conduction of said transistor including a Zener diode, means for deriving a first voltage that is proportional to the output voltage of said generator including a voltage dividing network connected directly across the output terminals of the generator, means for deriving a second voltage that is proportional to the current passing through said rectifier, and means for applying the difference of said first and second voltages to said control circuit whereby said generator has an output voltage which is increased a sufficient amount over that necessary to charge the battery to compensate for the voltage drop across said rectifier.

17. In a battery charging circuit, the combination comprising, a direct current generator having a field winding, a storage battery connected with said generator to be charged thereby, a rectifier connected between said generator and said storage battery for preventing current flow from said storage battery toward said generator, a first transistor having an emitter-collector circuit connected with the output terminals of the generator and with said generator field for controlling the current flow therethrough, a second transistor controlling the conduction of said first transistor, a voltage dividing network connected directly across the output terminals of the generator, a Zener diode connected between said voltage dividing network and the base electrode of said second transistor, and a resistor connected in series with said generator and with said voltage dividing network, the voltage drops across said resistor and at least a portion of said voltage dividing network being operative to control the conduction of said second transistor with the voltage drop across the resistor tending to cause an increase in the output voltage of the generator by an amount sufficient to compensate for the voltage drop across said rectifier.

[18. In a combined voltage and current regulating circuit, a combination comprising, a source of direct current power having a control winding, an output circuit energized by said source of power, a first semiconductor having a pair of current carrying electrodes and a control electrode, means connecting the current carrying electrodes of said semiconductor in series with said control winding and across said output circuit, voltage developing means connected across said output circuit for developing a voltage in accordance with changes in voltage appearing across said output circuit, voltage responsive means connected between said voltage developing means and the control electrode of said semi-conductor for controlling the conduction of said semi-conductor between its current carrying electrodes, a voltage developing circuit element connected in series with said semi-conductor, means connecting said voltage developing circuit element, with said voltage responsive means and with said voltage developing means, and means for varying the conduction of said semi-conductor in response to current flow through one of the leads of said output circuit.]

[19. In a combined voltage and current regulating circuit, a combination comprising, a power source having a control winding, a two-lead direct current output circuit energized by said power source, a semi-conductor having a pair of current carrying electrodes and a control electrode, means connecting the current carrying electrodes of said semi-conductor in series with said control winding and across said two-lead direct current output circuit, a voltage developing circuit connected across said two-lead output circuit, a voltage responsive circuit element connected between said voltage developing circuit and the control electrode of said semi-conductor for controlling the conduction of said semi-conductor between its current carrying terminals, a circuit element adapted to develop a voltage upon current flow therethrough connected in series with one of the current carrying terminals of said semi-conductor, means connecting said circuit element with at least a portion of said voltage developing circuit and with said voltage responsive circuit element, and means for controlling the conduction of said semi-conductor between its current carrying terminal in response to current flow in said two-lead output circuit.]

[20. In a combined voltage and current regulating circuit, a combination comprising, a power source having a control winding, a direct current output circuit energized by said power source, a transistor having emitter, collector and base electrodes, a first current path connected across said direct current output circuit including said control winding, the emitter to collector circuit of said transistor, and a voltage developing circuit element, a voltage divider network connected across said direct current output circuit including a resistor and the emitter to collector circuit of a second transistor, voltage responsive means connected between said voltage divider network and the base electrode of said first transistor for controlling its conduction, means for varying the conduction of said second transistor between its emitter and collector in accordance with current flow through said direct current output circuit, and means connecting said voltage developing circuit element with said voltage responsive means and with said voltage divider network.]

[21. In a combined voltage and current regulating circuit, the combination comprising, a power source having a control winding, a direct current output circuit energized by said power source, a first transistor having emitter, collector and base electrodes, means connecting the emitter to collector circuit of said first transistor and said control winding in series and across said output circuit, a voltage dividing network connected across said output circuit, said voltage dividing network including a resistor and emitter to collector circuit of a second transistor, means connected with said second transistor for controlling its conduction from emitter to collector in accordance with current flow in said output circuit, a voltage responsive diode connected with said voltage dividing network and with the base electrode of said first transistor for controlling the conduction of said first transistor from emitter to collector in accordance with the voltage developed across said voltage divider network, and a resistor connected in series with the emitter electrode of said first transistor, said resistor being connected with said voltage responsive diode and with said voltage divider network.]

[22. In combination, a power source having a control winding for controlling the voltage output of said source as a function of current flow therethrough, a load circuit connected with said power source to be energized thereby, a storage battery connected with said load circuit, a rectifier connected between said power source and said battery for preventing current flow from said battery toward said power source, a transistor, means connecting said transistor and said control winding in series across said load circuit whereby the current flow through said control winding is controlled as a function of the conductance of said transistor, means for developing a first voltage that is proportional to output voltage of said power source, means for generating a second voltage that is dependent on output current of said power source, means for generating a third voltage that is dependent on output current of said power source, and means for controlling the conduction of said transistor in response to said first, second, and third voltages, said first and second voltages providing voltages and current regulation and said third voltage providing compensation for the voltage drop across said rectifier.]

*23. In combination, a power source, a control winding for varying the voltage output of said power source as a function of current flow there through, a first transistor having emitter, collector, and base electrodes, a second transistor having emitter, collector and base electrodes, and an output circuit energized by said power source, a first circuit connected across the said output circuit including the emitter-collector circuit of said first transistor and said control winding, a second circuit connected across said output circuit including the emitter-collector circuit of said second transistor, means connecting the base electrode of said first transistor with the collector electrode of said second transistor, voltage responsive means connected with said output circuit and the base electrode of said second transistor, said voltage responsive means including a voltage divider means connected across said output circuit and a semi-conductor voltage breakdown device connected to said voltage divider and to said base electrode of said second transistor, and means for causing said first transistor to operate at only two stable conditions of operation, one of which is the substantially fully conductive state and the other of which is the substantially fully non-conductive state, said last named means including a feedback circuit connecting said first circuit and the base circuit of said second transistor.*

* * * * *

UNITED STATES PATENT OFFICE

CERTIFICATE OF CORRECTION

PATENT NO. : Reissue 29,475

DATED : November 15, 1977

INVENTOR(S) : James L. Jensen

It is certified that error appears in the above-identified patent and that said Letters Patent are hereby corrected as shown below:

In column 9, line 54, "input" should be --output--.

In column 11, line 52, "adid" should be --said--.

Signed and Sealed this

*Seventh* Day of *March 1978*

[SEAL]

*Attest:*

RUTH C. MASON
*Attesting Officer*

LUTRELLE F. PARKER
*Acting Commissioner of Patents and Trademarks*